(12) United States Patent
Pavelka et al.

(10) Patent No.: US 6,312,132 B1
(45) Date of Patent: Nov. 6, 2001

(54) FLUORESCENT RED ARTICLE AND RETROREFLECTIVE ARTICLE MADE THEREFROM

(75) Inventors: Lee A. Pavelka, Cottage Grove; Deana A. Klein, Maplewood; David L. Bergeson, Mendota Heights; Susan T. Chrysler, Maplewood; David M. Burns, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/659,896

(22) Filed: Sep. 12, 2000

(51) Int. Cl.$^7$ .................................................. G02B 5/122
(52) U.S. Cl. .................. 359/530; 359/529; 359/536; 359/539; 359/540; 359/900; 156/305; 428/141; 428/407; 428/412
(58) Field of Search ................... 359/515, 529, 359/530, 534–542, 546, 900; 252/301.21, 301.26, 301.35; 546/37, 98; 428/141, 407, 412, 913; 156/60, 305, 325–328

(56) References Cited

U.S. PATENT DOCUMENTS

| | | |
|---|---|---|
| 2,407,680 | 9/1946 | Palmquist . |
| 3,190,178 | 6/1965 | McKenzie . |
| 3,684,348 | 8/1972 | Rowland . |
| 4,025,159 | 5/1977 | McGrath . |
| 4,511,210 | 4/1985 | Tung et al. . |
| 4,627,997 | 12/1986 | Ide ........................................ 428/216 |
| 4,801,193 | 1/1989 | Martin . |
| 4,845,223 | 7/1989 | Seybold et al. ..................... 546/37 E |
| 4,895,428 | 1/1990 | Nelson et al. . |
| 4,896,943 | 1/1990 | Tolliver et al. . |
| 4,938,563 | 7/1990 | Nelson et al. . |
| 4,950,525 | 8/1990 | Bailey ................................... 428/164 |
| 5,064,272 | 11/1991 | Bailey et al. ........................ 359/541 |
| 5,066,098 | 11/1991 | Kult et al. ............................ 359/540 |
| 5,141,837 | 8/1992 | Nguyen et al. ...................... 430/135 |
| 5,272,562 | 12/1993 | Coderre ................................ 359/529 |
| 5,387,458 | 2/1995 | Pavelka et al. ...................... 428/141 |
| 5,470,502 | 11/1995 | Hahn et al. . |
| 5,674,622 | 10/1997 | Burns et al. ......................... 428/412 |
| 5,754,337 | 5/1998 | Burns et al. ......................... 359/515 |
| 5,920,429 | 7/1999 | Burns et al. ......................... 359/515 |
| 6,048,069 | 4/2000 | Nagaoka et al. ..................... 359/529 |

FOREIGN PATENT DOCUMENTS

| | | |
|---|---|---|
| 0 792 907 | 9/1997 | (EP) . |
| 4-359942 | 12/1992 | (JP) . |
| WO 96/36647 | 11/1996 | (WO) . |
| WO 98/14802 | 4/1998 | (WO) . |
| WO 98/28946 | 7/1998 | (WO) . |
| WO 00/27908 | 5/2000 | (WO) . |

OTHER PUBLICATIONS

"Metrology of fluorescent retroreflective materials and its relationship to their daytime visibility", David M. Burns, Norbert L. Johnson, Analytica Chimica Acta 380 (1999) 211–226, (No month).

Primary Examiner—James Phan

(57) ABSTRACT

A fluorescent red article comprising a polymer matrix; and a perylene dicarboximide dye, wherein the article has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8, and laminates, retroreflective materials, and methods of making thereof.

20 Claims, 3 Drawing Sheets

FLUORESCENT RED ARTICLE AND RETROREFLECTIVE ARTICLE MADE THEREFROM

FIELD OF THE INVENTION

The invention relates to fluorescent red articles and laminates which are particularly useful for improving the visibility and conspicuity.

BACKGROUND OF THE INVENTION

It is commonly known that fluorescent colors provide increased conspicuity for visual signaling under most lighting conditions, and particularly under low natural lighting conditions. These conditions occur at dusk and at sunrise and present a challenge for traffic sign manufacturers. If increased conspicuity of an article is desired, the article is often colored with fluorescent colorants. Fluorescent colors allow enhanced conspicuity because the visual contrast that the fluorescent colors create with the environment is greater than that of similar non-fluorescent articles. Fluorescent colored traffic signs are effective at increasing the conspicuity of the signs and, in turn, increase the likelihood of the signs being observed.

Certain conventions have evolved with respect to the color of traffic signs. For example, informational signs may be green or blue, caution or warning signs may be orange or yellow, and yield and stop signs are red. Motorists have become accustomed to these conventions and color purity is important to encourage the appropriate response. Although red fluorescent dyes are available, their chromaticity or color purity can vary from pink to orange in dyed articles and may not have a true red appearance.

In addition to color purity, it is important for highway signage to be visually conspicuous. As the brightness or luminance of a sign increases, the more visually obvious the sign is relative to its background. The luminance of a fluorescing article is the sum of its reflected and emitted light. The greater the contribution from emitted light to total luminescence the brighter the appearance of the fluorescing article. It is therefore desirable to avoid conditions that quench fluorescence.

Various attempts to improve the visibility of signage have been reported. Burns et al., U.S. Pat. Nos. 5,920,429, 5,754,337, and 5,674,622 disclose fluorescent yellow articles comprising two fluorescent dyes dispersed in a polymeric matrix suitable for applying to retroreflective surfaces. The resulting yellow retroreflective articles are suitable for traffic signs.

Nagaoka et al., U.S. Pat. No. 6,048,069 disclose retroreflective sheeting having image elements made from light transmitting prismatic sheeting. An adhesive layer adheres the prismatic sheeting to the retroreflective sheeting and the adhesive may contain a red fluorescent dye.

Sakaya et al., European Patent Application No. 792,907 disclose polyolefin resin films suitable for outdoor use. The films contain fluorescent substances including perylene dyes and a shielding agent to suppress the deactivation of the fluorescent substance under outdoor conditions and from other substances in the film.

Nagaoka, International Application No. PCT/US97/17457 discloses a retroreflective graphic article having an image layer disposed on a retroreflective base sheet and a dye receiving layer disposed on the image layer. The image layer contains a pigment and a fluorescent dye. The fluorescent dye migrates to the receiving layer, thereby reducing adverse effects from the pigment on the visual properties of the dye.

Smith, International Application No. PCT/AU96/00303 discloses a method for making fluorescent dye compositions useful for making luminescent sunlight collectors from a solution of a fluorescent dye and a polymerizable monomer wherein the solution is prepared without additional solvent and with the aid of ultrasonic mixing. The monomer solution is polymerized in a vertical tube to form a luminescent sunlight collector.

SUMMARY OF THE INVENTION

Fluorescent articles of the present invention provide red color fidelity substantially free of orange or pink hues. Further, the articles of the invention have a visual brightness substantially attributable to fluorescent or emitted light with respect to the total light observed from the surface of the article. Accordingly, the present invention provides fluorescent red articles suitable for applying to a reflective substrate to form a laminate, the article having a substantial fluorescence luminance with respect to the total luminance of the article. Accordingly, the present invention in one aspect is a fluorescent red article comprising a polymer matrix and a red perylene dicarboximide dye having the formula

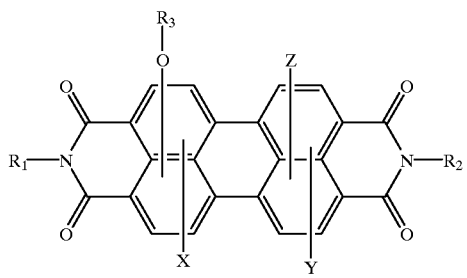

wherein $R_1$ and $R_2$ are identical or different $C_1$–$C_{18}$ is alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl; wherein the article has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

Another aspect of the present invention is a fluorescent red article having a retroreflective side.

Yet another aspect of the present invention is a fluorescent red laminate comprising a fluorescent red article applied to a reflective substrate wherein the laminate has chromaticity coordinates (x, y) within the area defined by (0.648, 0351), (0.735, 0.265), (0.629, 0.281) and (0.565,0.346) in terms of the CIE 1931 Standard Colorimetric System and measured using 0/45 geometry and evaluated with CIE Standard Illuminant D65 and a fluorescence luminance factor of at least about 8.

The present invention is also directed to a fluorescent red retroreflective laminate which includes a fluorescent red article disposed on a retroreflective substrate having a retroreflective side.

Another aspect of the invention is a fluorescent red retroreflective sheeting comprising optical elements which comprise a polymer matrix and a dye wherein the retroreflective sheeting has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8 as well as a fluorescent red retroreflective sheeting comprising optical elements and at least one layer comprising a polymer matrix and a dye wherein the retroreflective sheeting has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

A further aspect of the invention is a method for making a fluorescent red laminate comprising the steps of preparing a mixture of a polymeric resin and a red perylene dicarboximide dye having the formula

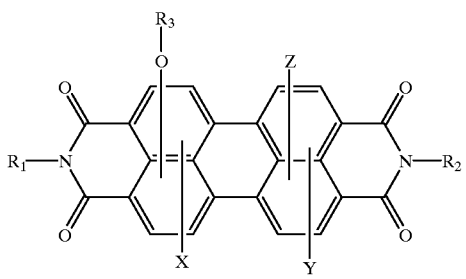

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl, extruding the mixture to form a film and applying the film to a substrate having an adhesive layer to form a laminate wherein the laminate has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

DETAILED DESCRIPTION OF THE INVENTION

In describing aspects of the invention certain terms will have the meaning defined herein.

"CIE" refers to the International Commission on Lighting which is the responsible body for international recommendations for photometry and colorimetry.

Figure 1:
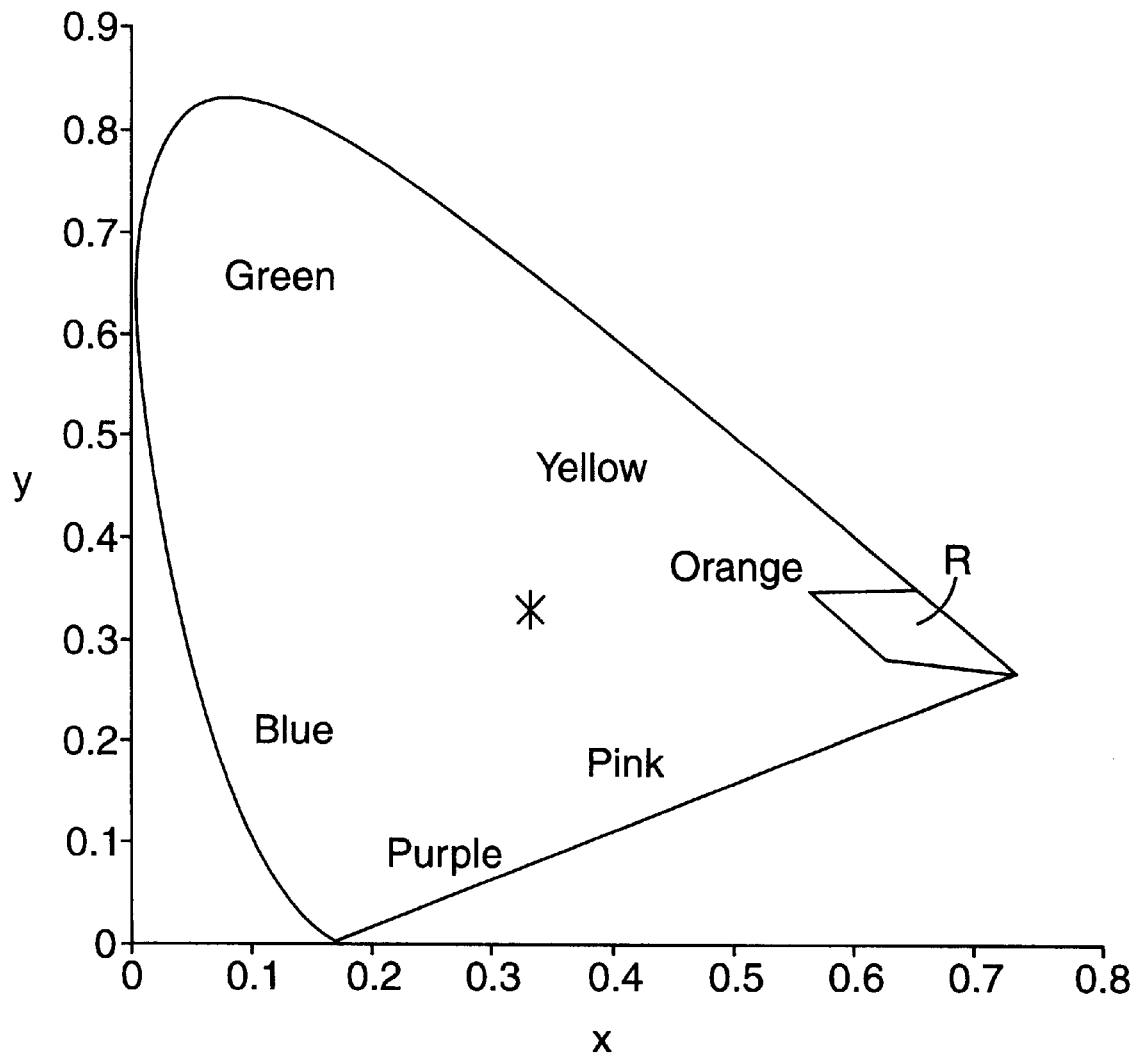
FIG. 1 is a 1931 CIE x, y chromaticity diagram showing areas within the diagram generally representing various color spaces.

"Chromaticity diagram" or "x, y diagram" refers to a two-dimensional diagram in which points specified by chromaticity coordinates (x, y) represent the chromaticities of color stimuli in the CIE color matching system. FIG. 1 shows the 1931 CIE x, y chromaticity diagram with color regions identified.

"Luminous" refers to the property of reflecting or emitting light from a surface.

"Luminance" refers to the luminous intensity or brightness of light radiating from a surface. Luminance is usually expressed as the CIE tristimulus value Y. Tristimulus values are the amounts of three primary colors that specify a color stimulus. Tristimulus values can be calculated if the reflectance spectrum of a sample is known and describe the whole sensation of color. The luminance value may be described and measured as total luminance ($Y_t$), reflected luminance ($Y_r$) and fluorescence luminance ($Y_f$). Total luminance is the sum of reflected and fluorescence luminance.

"Fluorescence" refers to luminescence that is caused by the absorption of radiation at one wavelength followed by nearly immediate re-radiation at a different wavelength and that ceases almost at once when the incident radiation stops.

"Visibility" refers to threshold of visual detection of an object with certainty by an observer actively searching for the object.

"Conspicuity" refers to the ease with which an object is visually discovered and is a function of the magnitude of the contrast between an object and the background. Objects become more conspicuous as their contrast with the surroundings increases. With respect to fluorescent objects, fluorescence luminance that is relatively a greater portion of total luminance under conditions of poor visibility provides greater visibility and conspicuity relative to a non-fluorescent object.

"Retroreflective" refers to the property of a surface to return a majority of incident light back in the direction of the source over a wide range of surface orientation with respect to the source. Colorimetric measurements for a retroreflective surface are defined in terms of measurement geometry. A preferred measurement geometry for retroreflective surfaces is 0/45 geometry as define by the 1931 CIE Standard Colorimetric System and evaluated with CIE Standard Illuminant D65.

Figure 2:
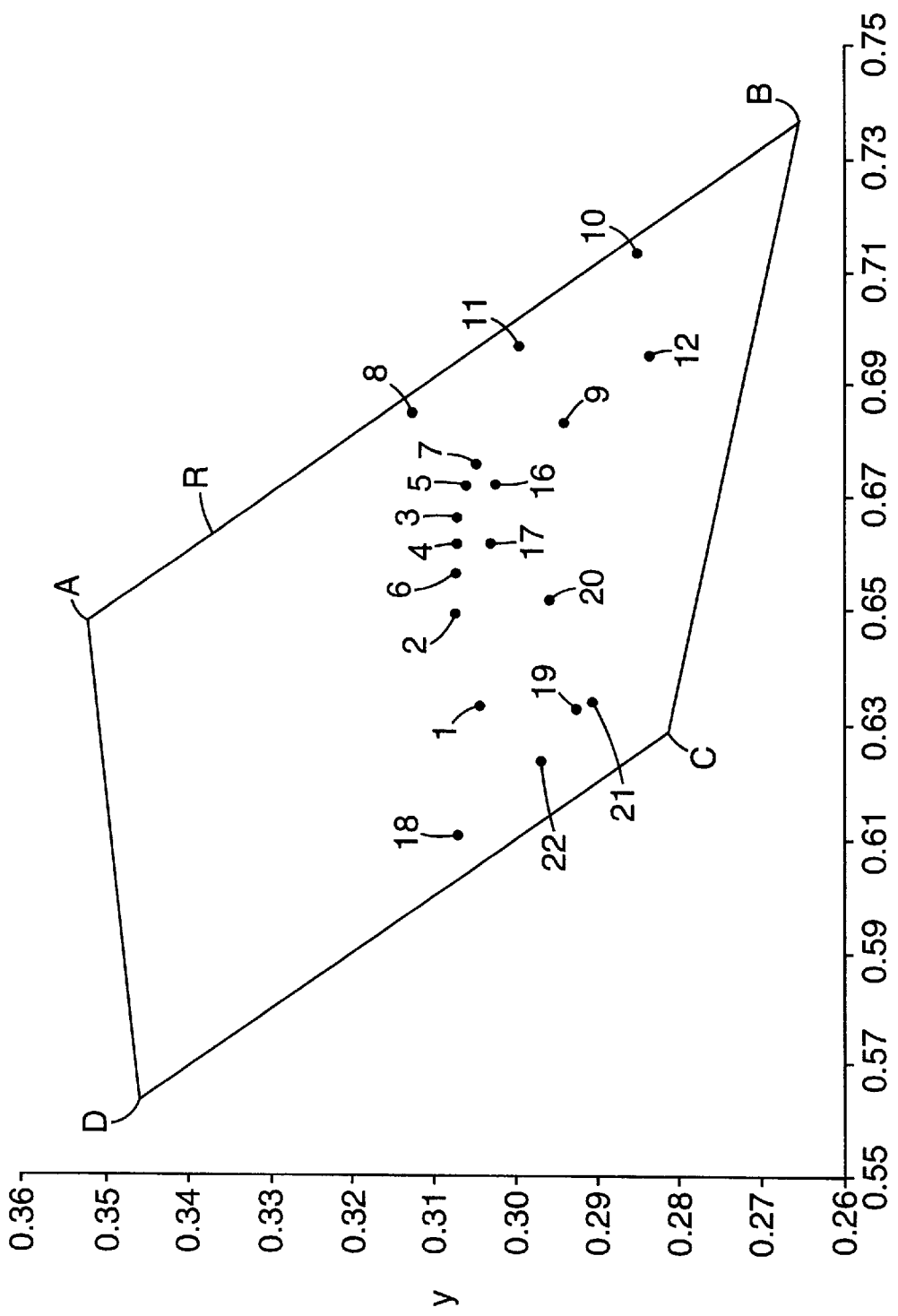
FIG. 2 is a 1931 CIE x, y chromaticity diagram defining the area of color space defined herein as red.

"Red" refers to the color which is within the area defined by the four CIE chromaticity (x, y) coordinates (0.648, 0351), (0.735, 0.265), (0.629, 0.281) and (0.565,0.346) in terms of the CIE 1931 Standard Colorimetric System and measured using 0/45 geometry and evaluated with CIE Standard Illuminant D65 as plotted and shown in FIG. 2.

In one aspect, the present invention relates to fluorescent articles having a perylene dicarboximide dye dispersed in a polymer matrix and having a red color defined by chromaticity coordinates (x, y) within the area (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8. The articles are preferably obtained by extruding a mixture of an effective color forming amount of the perylene dicarboximide dye and polymer to form an article, for example, a sheet. In suitable proportions, the dye level will provide a red fluorescent color within the chromaticity coordinates for red as defined above.

The preferred amount of dye is 0.1 to 5 wt. %, more preferably 0.1 to 3 wt. % and most preferably 0.1 to 1 wt. % based on the weight of the polymer.

A dye of the present invention is preferably dispersed in a polymer matrix or resin and provides an article having chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8. Suitable red dyes include perylene dicarboximide compounds having the formula

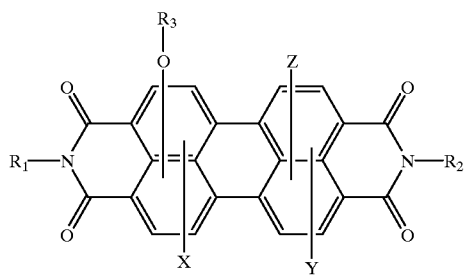

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl.

FIG. 1 shows a 1931 CIE x, y chromaticity diagram identifying various color regions. The area within the red color space R of the invention is defined by x, y chromaticity coordinates (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65. The asterisk indicates the D65 origin.

FIG. 2 shows a 1931 CIE x, y chromaticity diagram defining the color space (0.648,0.351), (0.735,0.265), (0.629, 0.281) and (0.565,0.346). Coordinate (0.648, 0.351) is designated as A. Coordinate (0.735, 0.265) is designated as B. Coordinate (0.629, 0.281) is designated as C. Coordinate (0.565, 0.346) is designated as D. The coordinates A, B, C and D define the red color space R of the invention. Data points summarized in the Examples are displayed and designated by Example number. The data points for Examples 13–15 are off-scale and not shown. The significance of the data points is discussed with the description of the Examples.

A preferred dye is perylene-1,6,7,12-tetraphenoxy-3,4,9, 10-tetracarboxylic acid-bis (2',6'-diisopropylanilide) and is commercially available under the trade designation "Lumogen F Red 300" from BASF Corp., Mount Olive N.J. The amount of dye for a particular use is chosen to provide the chromaticity and luminance values defined above for the articles made therefrom. If the dye content is too low, chromaticity and/or luminance values may fall outside of the parameters of the invention. If the dye content is too great, the dye may become self quenching of fluorescence and fail to meet the luminance requirement.

The polymer matrix comprises a thermoplastic or thermoset resin. Suitable resins include a polymer or copolymer that can be formed into an article. Suitable polymers include polyester, unsaturated polyesters, polycarbonate, polyolefin, polyurethane, polyacrylate, or polymethylmethacrylate polymers and copolymers. The polymer can be in the form of a powder, pellet or bead into which the dye can be suitably uniformly dispersed.

Suitable polymethylmethacrylate polymers include impact modified grade polymers commercially available under the trade designation "CP 923" from ICI Acrylics, Cordova, Tenn., medium grade impact modified polymethylmethacrylate commercially available under the trade designation "PLEXIGLAS MI-7" and polymethylmethacrylate commercially available under the trade designation "PLEXIGLAS V825" both from Atofina Chemicals, Philadelphia, Pa.

Suitable polycarbonate resins include bisphenol A polycarbonate commercially available under the trade designations "FCR-2407" from Bayer Corp., Pittsburgh Pa., "LEXAN 123R" from General Electric Company, Schenectady, N.Y. or "CALIBRE 300EP" from Dow Chemical Co., Midland, Mich.

Suitable polyester resins include polyethylene terephthalate polymer and copolymers commercially available under the trade designations "SPECTAR 14471" from Eastman Chemical Co., Kingsport, Tenn.

Suitable polyolefin polymers include resins commercially available under the trade designation "BYNEL 3100" series resins from DuPont Co., Wilmington, Del.

The selection of a resin for a particular use will depend on variables such as the effect of the resin on the color properties of the extruded sheet, ease of processing into an article, and physical properties of the article such as flexibility, impact resistance, elongation and the like. Suitable resins will not adversely affect the chromaticity and luminance of the article. A person of ordinary skill in the art can readily measure these properties by methods described herein or by methods described in compilations of methods such as those published by the American Society of Testing Materials (ASTM) and the American National Standards Institute (ANSI).

Various additives may optionally be incorporated into the polymer matrix. These include transparent pigments commercially available under the trade designations "C.I. Red 178", "C.I. Red 179" or "C.I. Red 224" from BASF Corp., Mount Olive N.J.; ultraviolet (UV) light absorbers commercially available under the trade designations "TINUVIN 328" from Ciba Specialty Chemicals, Inc. Tarrytown N.Y., "CYASORB UV-1164" and "CYTEC UV531" from Cytec Industries, Stamford, Conn.; and processing aids. The selection of additives will depend on the intended use of the desired article. However, regardless of intended use, additives which adversely affect the color properties of the fluorescent article as defined above are not contemplated by the invention.

The fluorescent article of the present invention may be in any form and is preferably in the form of a sheet or film. An article can be prepared from the polymer and dye mixture by compression molding, casting, calendaring, extruding and the like as well understood in the art. In an embodiment where the article is a sheet or film, the thickness of the sheet is typically 0.02 mm to 1.0 mm, preferably 0.02 mm to 0.3 mm or more preferably 0.02 mm to 0.2 mm. A sheet may be substantially flat on both sides or have cube-corner retroreflective elements embossed on one side.

The fluorescent article of the invention in the form of, for example, a sheet may be laminated to a reflective or retroreflective substrate. The laminate may be formed by thermally fusing the sheet to the substrate or by interposing an adhesive layer between the sheet and the substrate. Suitable adhesives will not affect the color or luminance of the laminate. Exemplary adhesives include a transparent acrylic adhesive.

Lamination may be performed as understood by one skilled in the art, for example, by applying heat and pressure, or by pressure alone, to achieve a uniformly laminated article. Pressure can be applied, for example, by nip rollers or by a hand roller. Alternatively, lamination may be performed using an adhesive. Extrusion may be performed as understood by one skilled in the art.

Generally, retroreflective materials include a monolayer of optical elements typically in the form of glass microspheres (i.e., beads). These microspheres can be embedded in a polymeric binder layer or pressed into a polymeric film, for example. Alternatively, the retroreflective materials can include prismatic-type optical elements. Such materials are well known to those of skill in the art.

Retroreflective materials (also referred to as sheeting) of the present invention may be, for example, "beaded sheeting" in the form of an enclosed-lens sheeting, embedded-lens sheeting, or encapsulated-lens sheeting, as well as cube corner retroreflective sheeting. Such articles are described, for example, in U.S. Pat. Nos. 2,407,680; 4,511,210; 4,950, 525; 3,190,178; 4,025,159; 4,896,943; 5,064,272; 5,066, 098; 3,684,348; 4,801,193;

4,895,428; and 4,938,563.

Retroreflective sheetings include those commercially available under the trade designation "Diamond Grade LDP 3970 Retroreflective Sheeting" and "Diamond Grade VIP 3990 Retroreflective Sheeting", "Scotchlite Engineering Grade Sheeting" and "Scotchlite High Intensity Grade Reflective Sheeting" from Minnesota Mining and Manufacturing Company, St. Paul, Minn. (3M).

A protective layer or overlay also may be applied to the non-retroreflective side of the fluorescent sheet and form an exterior side to the laminate. The overlay may be made from the same polymeric resin as the fluorescent sheet. The overlay may be transparent and may contain UV light absorbing materials to protect the laminate from the adverse effect of exposure to sunlight. UV light absorbing materials include benzotriazoles such as those available under the trade designation "TINUVIN 327" from Ciba Specialty Chemicals, benzophenones such as those available under the trade designation "CYASORB 531" or triazines such as those available under the trade designation "CYASORB UV 1164" which are commercially available from Cytec Industries, West Patterson N.J. The overlay also serves to protect the laminate from deleterious effects of weather, ozone and other environmental contaminants. The overlay may be attached to the fluorescent article by an adhesive or by co-extrusion during formation of the fluorescent article.

In yet another embodiment, the fluorescent red article, for example, as a sheet or film, may be a component of a retroreflective sheeting or material. For example, the article may be substituted for a traditional layer of the sheeting or material. In addition, the article of the present invention may form the elements themselves, for example, in the case of cube corner elements or microreplicated elements. In one aspect, the retroreflective sheeting may comprise optical elements which comprise polymer matrix and dye or may comprise optical elements laminated to an overlay film comprising polymer matrix and dye. Alternatively, the retroreflective sheeting may comprise optical elements, for example, glass microspheres, cube corner elements, or microreplicated elements; and at least one layer of the sheeting, for example, as described in any of U.S. Pat. Nos. 2,407,680; 4,511,210; 4,950,525; 3,190,178; 4,025,159; 4,896,943; 5,064,272; 5,066,098; 3,684,348; 4,801,193; 4,895,428; and 4,938,563, which comprises polymer matrix and dye. Such layers include a binder layer for the elements, an overlay or top film, or a spacing layer. A spacing layer may be present in an enclosed lens retroreflective sheeting and is located behind, i.e., opposite the side of the elements (for example, glass microspheres) at which light is incident. Such retroreflective sheeting or material can be prepared as understood in the above-referenced patents as well as in accordance with the description herein for preparing the fluorescent article of the present invention.

Articles of the present invention may be represented by various embodiments. Reference to the figures illustrates several embodiments.

Figure 3A:
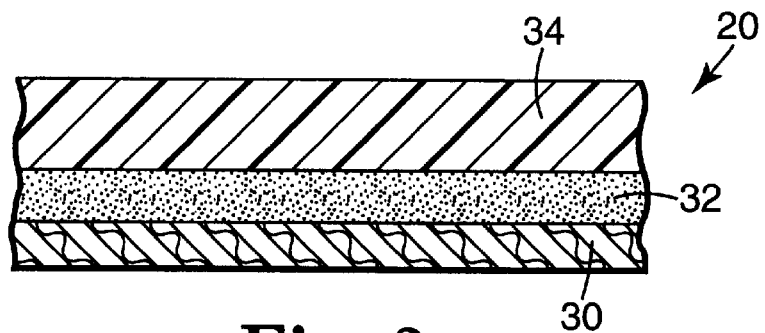
FIG. 3a is a cross sectional illustration of a portion of one embodiment of the invention.

FIG. 3a shows laminate 20 with fluorescent article 34 disposed on and affixed to releasable support layer 30. Adhesive 32 is interposed between fluorescent article 34 and support layer 30. Support layer 30 protects adhesive 32 and facilitates handling of fluorescent article 34 prior to its use. Releasable support layer 30 may be paper coated with a release agent (not shown) such as a silicone material, for example, with adhesive 32 in contact with the release agent.

Figure 3B:
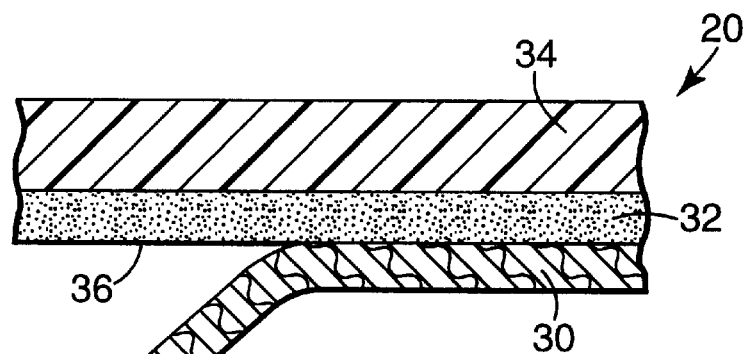
FIG. 3b is a cross sectional illustration of a portion of another embodiment of the invention.

FIG. 3b shows laminate 20 with fluorescent article 34 with support layer 30 partially stripped from adhesive 32. Exposed adhesive surface 36 can be affixed to a rigid support (not shown) to form a laminate structure such as a sign.

Figure 4:
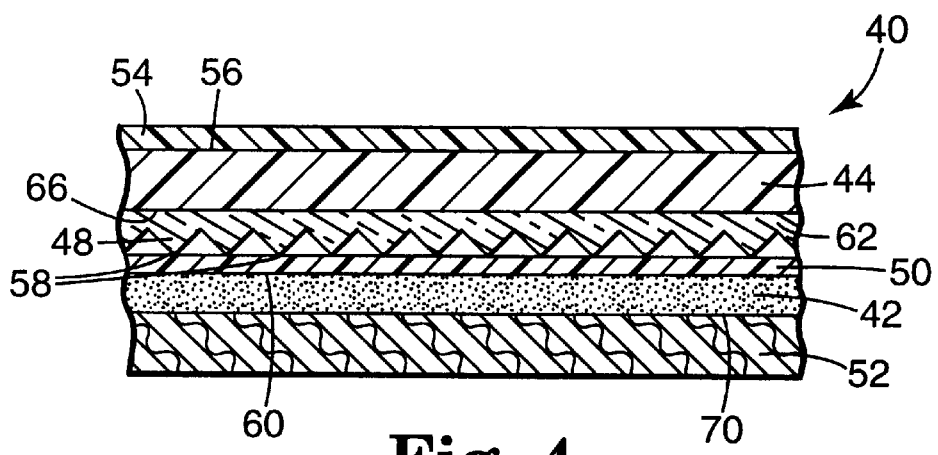
FIG. 4 is a cross sectional illustration of a portion of another embodiment of the invention.

FIG. 4 shows another embodiment of the invention wherein laminate 40 is formed from fluorescent article 44 and retroreflective substrate 62 having cube corner retroreflective elements 48. Fluorescent article 44 has protective overlay 54 applied to surface 56 opposite surface 66 having cube corner retroreflective elements 48. Film 50 is positioned on protruding corners 58 of cube corner retroreflective elements 48 to hermetically seal cube corner retroreflective elements 48. Film 50 helps maintain an air interface on cube corner retroreflective elements 48 which is important for total internal reflection for efficient retroreflection. Film 50 may be heat sealed, adhesively bonded or ultrasonically welded to cube corner retroreflective elements 48 in an intermittent pattern that provides hermetically sealed cells. Film 50 also may provide a uniform white backing which, when appropriately pigmented, enhances the color and fluorescence of the construction. Surface 60 of film 50 is placed in contact with adhesive layer 42 on support layer 52. Support layer 52 may be, for example, paper, polyester or polyolefin and preferably has a release coating (not shown) such as a silicone release agent on surface 70 in contact with adhesive 42. Support layer 52 may be stripped from laminate 40 leaving adhesive 42 on surface 60 of film 50 prior to affixing laminate 40 to a rigid support (not shown) such a signage.

Chromaticity coordinates and total and fluorescence luminance were determined using a Labsphere BFC-450 Bispectral Fluorescence Colorimeter having two monochromaters and available from Labsphere, Inc., North Sutton, N.H. The two monochromator method is the most accurate method for the color measurement of fluorescent materials. The method requires a two monochromator spectrophotometer employing monochromatic illumination and monochromatic viewing. A two monochromator instrument, also known as bispectral colorimeters, allow the separate measurement of the reflective radiance and fluorescence radiance at each combination of illumination and viewing wavelength. This allows separation of fluorescence luminance ($Y_f$) from total luminance ($Y_t$).

EXAMPLES

The following Examples show chromaticity and luminance of articles according the invention. Samples of an appropriate size were cut from sheets comprising the Examples and mounted on a reflective substrate for the measurement of color properties.

Examples 1–10

Red fluorescent articles according to the present invention were prepared by mixing acrylic resin beads (clear impact modified grade polymethylmethacrylate "CP 923" resin from ICI Acrylics, St. Louis, Mo.) with fluorescent dye ("Lumogen Red F 300"). The dye-resin mixture was then extruded from the melt into 0.1 mm thick sheets using a single screw extruder with three heating zones set at 249° C. to 260° C. to provide a color sheet. The color sheet was laminated to "Scotchlite Diamond Grade LDP 3970 Retroreflective Sheeting" for Examples 1–6 and "Scotchlite 3990 High Intensity Grade Sheeting" for Examples 7–10. The sheeting had a pressure sensitive adhesive layer on one surface and the laminate was formed by applying the color sheet to the adhesive layer. The laminated sheet was mounted on a rigid backing for determining the chromaticity coordinates and luminance of the Example. The colorimetric properties of Examples 1–10 are summarized in Table 1.

TABLE 1

| Example No.[a] | Dye Wt. %[b] | CIE x, y Coordinates | $Y_f$ | $Y_t$ | $Y_f/Y_t$ |
|---|---|---|---|---|---|
| 1 | 0.2 | 0.633, 0.304 | 18.33 | 25.33 | 0.723 |
| 2 | 0.3 | 0.651, 0.307 | 18.17 | 23.14 | 0.785 |
| 3 | 0.4 | 0.670, 0.307 | 17.44 | 21.29 | 0.819 |
| 4 | 0.5 | 0.666, 0.305 | 17.2 | 20.91 | 0.823 |
| 5 | 0.6 | 0.675, 0.313 | 16.8 | 20.39 | 0.829 |
| 6 | 0.8 | 0.660, 0.307 | 15.47 | 18.5 | 0.836 |
| 7 | 0.6 | 0.677, 0.303 | 12.97 | 17.09 | 0.759 |
| 8 | 0.6 | 0.688, 0.311 | 15.88 | 19.74 | 0.804 |
| 9 | 0.6 | 0.686, 0.293 | 9.05 | 11.88 | 0.762 |
| 10 | 0.54 | 0.716, 0.284 | 13.07 | 16.23 | 0.805 |

[a]Samples prepared on "Scotchlite Diamond Grade LDP 3970 Retroreflective Sheeting" commercially available from 3M unless indicated otherwise.
[b]wt. % "Lumogen Red F 300" based on weight of resin forming the polymeric matrix.

Examples 1–10 show that fluorescent red articles having dye present at various concentrations on different substrates maintain color integrity within the chromaticity color box defined by x, y coordinates (0.648, 0.351), (0.735, 0.265), (0.629, 0.281) and (0.565, 0.346) and have a fluorescence luminance factor of at least about 8 and have a ratio of the fluorescence luminance factor to the total luminance factor of at least about 0.7.

Examples 11–12

Examples 11 and 12 were prepared as in Example 1 with "Lumogen Red F300" at a 0.54 wt. % loading. In addition to the fluorescent dye, a light transmissive pigment was added at a 0.15 wt. %. The red pigments used were predispersed in an acrylic resin, commercially available from Atofina Chemicals, under the trade designation "VO45-UVA" at a 50 wt. % loading. The concentrate was then added to impact modified grade polymethylmethacrylate "CP 923" resin mixed with fluorescent dye to achieve the loading stated in the extruded film. Example 11 was made with P.R. 224 (Lot RD-50096 supplied by Penn Color, Doylestown, Pa.) and Example 12 was made with P.R. 179 (Lot RD-50095 supplied by Penn Color, Doylestown, Pa.). The calorimetric properties of Examples 11–12 are summarized in Table 2.

TABLE 2

| Example No.[a] | Dye Wt. %[b] | CIE x, y Coordinates | $Y_f$ | $Y_t$ | $Y_f/Y_t$ |
|---|---|---|---|---|---|
| 11 | 0.5 | 0.700, 0.299 | 11.1 | 15.61 | 0.711 |
| 12 | 0.5 | 0.697, 0.282 | 10.96 | 15.08 | 0.727 |

[a]Samples prepared on "Scotchlite Diamond Grade LDP 3970 Retroreflective Sheeting" commercially available from 3M unless indicated otherwise.
[b]wt. % Lumogen Red F 300 based on weight of resin forming the polymeric matrix.

Comparative Examples 13–15

Examples 13 to 15 were made at the dye loadings described in Example 2 of U.S. Pat. No. 4,845,223. Film was extruded at 0. 1, 0.3 and 0.7 mm thickness, respectively, and laminated using an acrylic pressure sensitive adhesive to the material available under the trade designation "Scotchlite Diamond Grade LDP 3970" from 3M, and evaluated for color and fluorescence with the results given in Table 3. The calorimetric properties of Examples 13–15 are summarized in Table 3.

TABLE 3

| Example No.[a] | Dye Wt. %[b] | CIE x, y Coordinates | $Y_f$ | $Y_t$ | $Y_f/Y_t$ |
|---|---|---|---|---|---|
| 13 | 0.001 | 0.332, 0.340 | 1.53 | 40.24 | 0.038 |
| 14 | 0.001 | 0.347, 0.337 | 3.82 | 31.28 | 0.122 |
| 15 | 0.001 | 0.356, 0.330 | 4.33 | 30.76 | 0.141 |

[a]Samples prepared on "Scotchlite Diamond Grade LDP 3970 Retroreflective Sheeting" commercially available from 3M unless indicated otherwise.
[b]wt. % Lumogen Red F 300 based on weight of resin forming the polymeric matrix.

Example 16

A film of Example 5 was laminated at about 200° C. with sufficient pressure to provide uniform lamination to poly carbonate cube-corner sheet with a clear acrylic overlay on top to give a structure with retroreflective elements and a layer of clear polycarbonate (commercially available under the trade designation "MAKROLON 2407" from Bayer Corp., Pittsburgh Pa), attached to the film of Example 5, with a top surface of impact modified acrylic (clear medium impact modified grade acrylic with UV light absorber commercially available under the trade designation "Plexiglas PRD 289" from Atofina Chemical Co., Philadelphia Pa.). For color measurement, the cube structures were backed by a white polyester film for color measurement, the white polyester film having chromaticity x, y coordinates of 0.310, 0.327 and a total luminance factor $Y_t$ of 74.97 and a fluorescence luminance factor $Y_f$ of 0.0. Example 16 (with the white polyester film as a backing) had chromaticity x, y color coordinates of 0.673, 0.301 with fluorescence luminance of 15.82 and total luminence of 19.53 for a ratio of fluorescence luminence to total luminence of 0.810.

Examples 17–22

Examples 17≧22 illustrate fluorescent articles of the invention using various polymer matrices.

Example 17 was prepared as in Example 1 with "Lumogen Red F300" at a 0.3% loading in polycarbonate commercially available under the trade designation "FCR-2407" from Bayer Corp., Pittsburgh, Pa. Extrusion conditions for polycarbonate (PC) were 260–304° C. The resulting 0.1 mm sheet was laminated with an acrylic pressure sensitive adhesive to material available under the trade designation "Scotchlite Diamond Grade LDP 3970 Retroreflective Sheeting" from 3M. The laminated sheet was mounted on a rigid backing for determining the chromaticity coordinates and luminance of the Example.

Example 18 was prepared as in Example one with "Lumogen Red F300" at a 0.2 wt. % loading in an acid/acrylate-modified ethylenevinylacetate (EVA) resin commercially available under the trade designation "Bynel 3101" from Dupont Company, Wilmington Del. Extrusion conditions for "Bynel 3101" were 120–210° C. Two of the resulting 0.085 mm sheets were layered and laminated with an acrylic pressure sensitive adhesive and then laminated with the acrylic pressure sensitive adhesive to "Scotchlite Diamond Grade LDP 3970 Retroreflective Sheeting" commercially available from 3M. The laminated sheet had a color layer thickness of 0.17 mm and was mounted on a rigid backing for determining the chromaticity coordinates and luminance.

Example 19 was prepared as in Example 1 with "Lumogen Red F300" at a 0.2 wt. % loading in polyvinyl chloride resin (PVC) (formulation S00354 containing UV absorbers and plasticizer) from Alpha Chemical Plastics Co., Newark N.J. The extrusion conditions for this PVC were 175–205° C. The resulting 0.11 mm sheet was laminated with acrylic pressure sensitive adhesive to "Scotchlite Diamond Grade LDP 3970 Retroreflective Sheeting" commercially available from 3M. The laminated sheet was mounted on a rigid backing for determining the chromaticity coordinates and luminance of the Example.

Example 20 was prepared as in Example 1 with "Lumogen Red F300" at a 0.25 wt. % loading in a copolyester resin (cPET) commercially available under the trade designation "SPECTAR 14471" from Eastman Chemical Company, Kingsport, Tenn. Extrusion conditions for the "SPECTAR 14471" were 249–271° C. Two of the resulting 0.076 mm sheets were layered and laminated using an acrylic pressure sensitive adhesive and then laminated with the acrylic pressure sensitive adhesive to "Scotchlite Diamond Grade LDP 3970 Retroreflective Sheeting" commercially available from 3M using a transparent adhesive. The laminated sheet had a color layer thickness of 0.15 mm and was mounted on a rigid backing for determining the chromaticity coordinates and luminance of the Example.

Example 21 was prepared as in Example one with "Lumogen Red F300" at a 0.25% loading in "SELAR 7001", an amorphous polyester resin (PET) commercially available from DuPont Company, Wilmington, Del. Extrusion conditions for the "SELAR 7001" were 241–260° C. Three of the resulting 0.07 mm sheets were layered using an acrylic pressure sensitive adhesive and then laminated with the acrylic pressure sensitive adhesive to "Scotchlite Diamond Grade LDP 3970 Retroreflective Sheeting" commercially available from 3M using a transparent adhesive. The laminated sheet had a color layer thickness of 0.23 mm and was mounted on a rigid backing for determining the chromaticity coordinates and luminance.

Example 22 was prepared as in Example 1 with "Lumogen Red F300" at a 0.2% loading in a polyurethane resin (PUR), commercially available under the trade designation "Morthane PNO3" from Morton International, Inc., Seabrook, N.H. Extrusion conditions for "Morthane PNO3" were 154–199° C. Two of the resulting 0.1 mm sheets were hand laminated at room temperature and then hand laminated to "Scotchlite Diamond Grade LDP 3970 Retroreflective Sheeting" commercially available from 3M. The laminated sheet had a color layer thickness of 0.2 mm and was mounted on a rigid backing for determining the chromaticity coordinates and luminance.

The colorimetric properties of Examples 17–22 are summarized in Table 4.

TABLE 4

| Example No.[a] | POLYMER | Dye Wt. %[b] | Color Layer Thickness | CIE x, y Coordinates | $Y_f$ | $Y_t$ | $Y_f/Y_t$ |
| --- | --- | --- | --- | --- | --- | --- | --- |
| 17 | PC | 0.3 | 0.1 mm | 0.666, 0.302 | 14.31 | 18.47 | 0.775 |
| 18 | EVA | 0.2 | 0.17 mm | 0.614, 0.308 | 16.35 | 22.02 | 0.743 |
| 19 | PVC | 0.2 | 0.11 mm | 0.634, 0.291 | 12.11 | 16.19 | 0.748 |
| 20 | cPET | 0.25 | 0.15 mm | 0.654, 0.296 | 13.03 | 16.83 | 0.774 |
| 21 | PET | 0.25 | 0.23 mm | 0.636, 0.290 | 8.87 | 11.79 | 0.752 |
| 22 | PUR | 0.2 | 0.2 mm | 0.626, 0.296 | 12.52 | 16.85 | 0.743 |

[a]Samples prepared on "Scotchlite Diamond Grade LDP 3970 Retroreflective Sheeting" commercially available from 3M unless indicated otherwise.
[b]wt. % "Lumogen Red F 300" based on weight of resin forming the polymeric matrix.

The complete disclosure of all patents, patent documents and publications are incorporated herein by reference as if individually incorporated. Various modifications and alterations of this invention will become apparent to those skilled in the art without departing from the scope and spirit of this invention.

What is claimed is:

1. A fluorescent red article comprising:

a. a polymer matrix; and
    b. a perylene dicarboximide dye of the formula

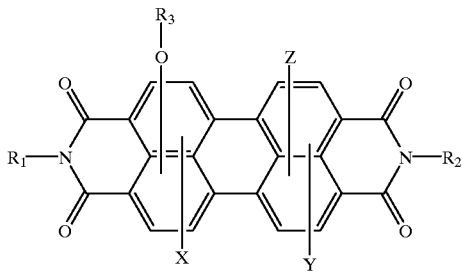

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl; and wherein the article has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

2. The article of claim 1 wherein the fluorescence luminance factor is at least about 10.

3. The article of claim 1 wherein the article has a total luminance factor of at least about 11.

4. The article of claim 3 wherein the ratio of the fluorescence luminance factor to the total luminance factor is at least about 0.7.

5. The article of claim 4 wherein the ratio of the fluorescence luminance factor to the total luminance factor is at least about 0.75.

6. The article of claim 1 wherein the dye is about 0.1 wt. % to about 1 wt. % of the polymeric matrix.

7. The article of claim 1 wherein the matrix comprises at least one of a polycarbonate, a polyester, a polyacrylate, a polymethylmethacrylate, a polyurethane and a polyolefin.

8. The article of claim 7 comprising a sheet having a thickness of about 0.02 mm to about 1.0 mm.

9. The article of claim 8 wherein the sheet has retroreflective elements on one side.

10. The article of claim 1 wherein the polymer matrix is a thermoplastic polymer.

11. A fluorescent red reflective laminate comprising:

a. a fluorescent sheet comprising:
        i. a polymer matrix;
        ii. a perylene dicarboximide dye of the formula

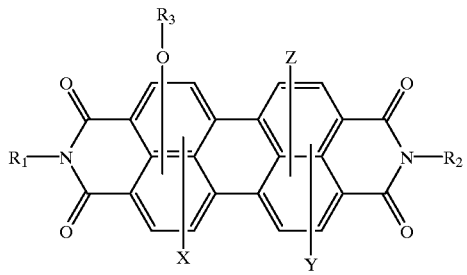

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl; and wherein the article has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8; and b. a reflective substrate wherein the fluorescent sheet is disposed on the reflective substrate to form a laminate.

12. The laminate of claim 11 wherein the reflective substrate is retroreflective.

13. The laminate of claim 11 wherein the polymer matrix is a thermoplastic polymer.

14. A method of making a fluorescent red laminate comprising the steps:

a. preparing a mixture of a polymeric resin and a red perylene dicarboximide dye having the formula

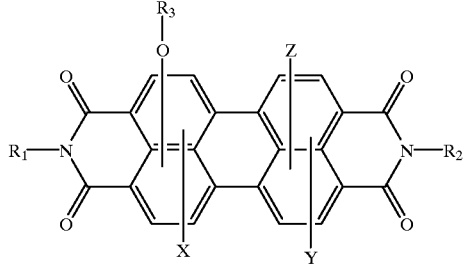

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl;

b. forming a polymeric sheet from the mixture; and c. applying the polymeric sheet to a substrate to form a laminate wherein the laminate has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence factor of at least about 8.

15. The method of claim 14 wherein the substrate has an adhesive layer and the polymeric sheet is applied to the adhesive layer.

16. The method of claim 14 wherein the polymeric sheet has retroreflective elements on one side.

17. The method of claim 12 wherein the polymeric resin is polycarbonate or polymethylmethacrylate.

18. A fluorescent red retroreflective sheeting comprising optical elements which comprise a. a polymer matrix;

b. a perylene dicarboximide dye of the formula

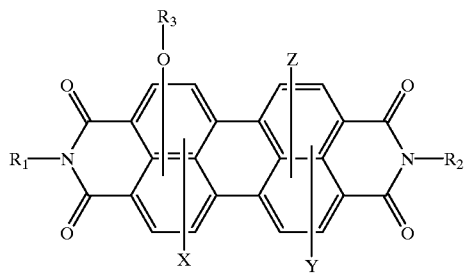

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio; cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl; and wherein the retroreflective sheeting has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

19. A fluorescent red retroreflective sheeting comprising optical elements and at least one layer comprising a. a polymer matrix;

b. a perylene dicarboximide dye of the formula

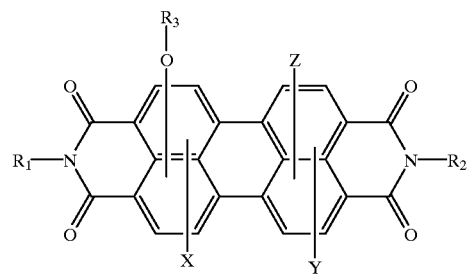

wherein $R_1$ and $R_2$ are identical or different $C_1$–$C_{18}$ alkyl which are unsubstituted or substituted by $C_1$–$C_{18}$ alkoxy, $C_1$–$C_{18}$ alkanoyloxy, $C_1$–$C_{18}$ alkylthio, hydroxyl, phenyl, phenoxy or phenylthio, cyclohexyl which is unsubstituted or substituted by hydroxyl, $C_1$–$C_5$ alkyl, methoxy, ethoxy, $C_1$–$C_2$ alkylthio, $C_1$–$C_{18}$ alkanoyloxy or $C_1$–$C_{18}$ alkoxycarbonyl; phenyl which is mono-substituted or di-substituted in the ortho position by $C_1$–$C_5$ alkyl or chlorine or by $C_1$–$C_5$ alkyl and chlorine; or naphthyl; X, Y and Z are each independently chlorine, bromine or —$OR_3$, and $R_3$ is unsubstituted phenyl, or phenyl substituted by cyano, halogen, nitro, $C_1$–$C_{18}$ alkyl or a mixture thereof, or naphthyl or anthryl; and wherein the retroreflective sheeting has chromaticity coordinates (x, y) within the area defined by (0.648, 0.351), (0.735, 0.265), (0.629, 0.281) and (0.565, 0.346) in terms of the CIE 1931 Standard Colorimetric System and measured using 0/45 geometry and evaluated with CIE Standard Illuminant D65 and a fluorescence luminance factor of at least about 8.

20. The sheeting of claim 19 wherein the at least one layer is a binder layer for the elements, an overlay, or a spacing layer.

* * * * *

UNITED STATES PATENT AND TRADEMARK OFFICE
CERTIFICATE OF CORRECTION

PATENT NO. : 6,312,132 B1  Page 1 of 1
DATED : November 6, 2001
INVENTOR(S) : Pavelka, Lee A.

It is certified that error appears in the above-identified patent and that said Letters Patent is hereby corrected as shown below:

Column 9,
Line 22, insert -- to -- following "according" and preceding "the".

Column 11,
Line 21, "17 $\geqq$ 22" should read -- 17 – 22 --.

Signed and Sealed this

Twenty-third Day of April, 2002

*Attest:*

JAMES E. ROGAN
*Attesting Officer*   *Director of the United States Patent and Trademark Office*